United States Patent
Datta et al.

(10) Patent No.: US 8,973,094 B2
(45) Date of Patent: Mar. 3, 2015

(54) EXECUTION OF A SECURED ENVIRONMENT INITIALIZATION INSTRUCTION ON A POINT-TO-POINT INTERCONNECT SYSTEM

(75) Inventors: Shamanna M Datta, Hillsboro, OR (US); Mohan J Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1190 days.

(21) Appl. No.: 11/442,230

(22) Filed: May 26, 2006

(65) Prior Publication Data

US 2007/0277223 A1    Nov. 29, 2007

(51) Int. Cl.
*H04L 9/32* (2006.01)
*G06F 21/00* (2013.01)
*G06F 21/53* (2013.01)
*G06F 21/74* (2013.01)

(52) U.S. Cl.
CPC ............. *G06F 21/00* (2013.01); *G06F 21/53* (2013.01); *G06F 21/74* (2013.01)
USPC ................................................. 726/2; 726/1

(58) Field of Classification Search
CPC .......... G06F 21/53; G06F 21/00; G06F 21/74
USPC ............. 713/282, 289; 726/26, 27, 28, 29, 30
See application file for complete search history.

(56) References Cited

U.S. PATENT DOCUMENTS

| | | | |
|---|---|---|---|
| 5,659,750 A | 8/1997 | Priem | |
| 5,905,861 A | 5/1999 | Lovell | |
| 6,035,382 A | 3/2000 | Lee | |
| 6,754,829 B1 | 6/2004 | Butt | |
| 2003/0105944 A1* | 6/2003 | Emer et al. .................... | 712/220 |
| 2004/0203605 A1* | 10/2004 | Safa .............................. | 455/411 |
| 2004/0228359 A1* | 11/2004 | Korb et al. .................... | 370/406 |
| 2005/0182940 A1* | 8/2005 | Sutton et al. .................. | 713/179 |
| 2006/0075312 A1* | 4/2006 | Fischer et al. ................. | 714/48 |
| 2006/0288209 A1* | 12/2006 | Vogler .......................... | 713/168 |
| 2007/0033311 A1* | 2/2007 | Young et al. .................. | 710/107 |
| 2007/0130457 A1* | 6/2007 | Kamat et al. ................. | 713/151 |

FOREIGN PATENT DOCUMENTS

| | | |
|---|---|---|
| CN | 1760884 A | 4/2006 |
| JP | 6-89241 A | 3/1994 |
| JP | H11-149385 A | 6/1999 |
| JP | 2002-91939 A | 3/2002 |
| JP | 2004-500666 A | 1/2004 |

(Continued)

OTHER PUBLICATIONS

International Search Report and Written Opinion received for PCT Patent Application No. PCT/US2007/069742, mailed on Sep. 21, 2007, 10 pages.

(Continued)

*Primary Examiner* — Jeffrey Pwu
*Assistant Examiner* — Nega Woldemariam
(74) *Attorney, Agent, or Firm* — Thomas R. Lane

(57) ABSTRACT

Methods and apparatus for initiating secure operations in a microprocessor system are described. In one embodiment, a system includes a processor to execute a secured enter instruction, and a chipset to cause the system to enter a quiescent state during execution of the secured enter instruction.

18 Claims, 4 Drawing Sheets

(56) References Cited

FOREIGN PATENT DOCUMENTS

| JP | 2005-513605 A | 5/2005 |
|---|---|---|
| JP | 2005-529401 A | 9/2005 |
| JP | 2005-535005 A | 11/2005 |
| JP | 2005-346689 A | 12/2005 |
| JP | 2006-507548 A | 3/2006 |
| KR | 10-2004-0101378 A | 12/2004 |
| WO | 2006/033837 A1 | 3/2006 |
| WO | 2007/140300 A1 | 12/2007 |

OTHER PUBLICATIONS

International Preliminary Report on Patentability received for PCT Patent Application No. PCT/US2007/069742, mailed on Dec. 11, 2008, 6 pages.

Office Action Received for German Patent Application No. 11 2007 001 321.4, mailed on Mar. 12, 2010, 3 pages of Office Action and 3 pages of English Translation.

Office Action Received for Chinese Patent Application No. 200780019112.X, mailed on Aug. 9, 2010, 4 pages of Office Action and 9 pages of English Translation.

Office Action Received for Taiwanese Patent Application No. 96118973, mailed on Oct. 13, 2010, 7 pages of Office Action and 11 pages of English Translation.

Office Action Received for Taiwanese Patent Application No. 96118973, mailed on Sep. 2, 2011, 7 pages of Taiwanese Office Action including 3 pages of English Translation.

Office Action Received for Korean Patent Application No. 10-2008-7028845, mailed on Oct. 7, 2010, 11 pages of Korean Office Action including 5 pages of English Translation.

Office Action Received for Japanese Patent Application No. 2009-506817, mailed on Jul. 12, 2011, 7 pages of Japanese Office Action including 4 pages of English Translation.

Office Action Received for Chinese Patent Application No. 200780019112.X, mailed on Mar. 5, 2012, 4 pages of Office Action and 3 pages of English Translation.

Office Action Received for Taiwanese Patent Application No. 96118973, mailed on Jul. 9, 2012, 7 pages Taiwanese Office Action including 3 pages of English Translation.

Office Action Received for Korean Patent Application No. 10-2008-7028845, mailed on Jan. 14, 2011, 4 pages of Korean Office Action and 3 pages of English Translation.

Office Action Received for Chinese Patent Application No. 200780019112.X, mailed on Dec. 3, 2012, 6 pages of Office Action and 8 pages of English Translation.

Office Action Received for Korean Patent Application No. 10-2008-7028845, mailed on Dec. 5, 2012, 4 pages of Korean Office Action and 3 pages of English Translation.

Office Action Received for Chinese Patent Application No. 2011-259595, mailed on Jun. 4, 2013, 6 pages of Office Action and 8 pages of English Translation.

Office Action Received for Japanese Patent Application No. 2011-259595, mailed on Oct. 15, 2013, 2 pages of Japanese Office Action and 2 pages of English Translation.

Office Action Received for Japanese Patent Application No. 2011-259595, mailed on Feb. 4, 2014, 3 pages of Japanese Office Action and 2 pages of English Translation.

Office Action Received for Chinese Patent Application No. 200780019112.X, mailed on Oct. 24, 2014, 3 Pages of Chinese Office Action and 4 Pages of English Translation.

\* cited by examiner

EXECUTION OF A SECURED ENVIRONMENT INITIALIZATION INSTRUCTION ON A POINT-TO-POINT INTERCONNECT SYSTEM

FIELD

The present invention relates generally to microprocessor systems, and more specifically to microprocessor systems that may operate in a trusted or secured environment.

BACKGROUND

The increasing number of financial and personal transactions being performed on local or remote microcomputers has given impetus for the establishment of "trusted" or "secured" microprocessor environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

Existing trusted systems may utilize a complete closed set of trusted software. This method is relatively simple to implement, but has the disadvantage of not allowing the simultaneous use of common, commercially available operating system and application software. This disadvantage limits the acceptance of such a trusted system.

Other approaches require systems to have their processors connected to each other through a front-side bus. These systems may not scale as well as systems that have their processors connected to each other through a point-to-point interconnect.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for initiating a trusted or secured environment in a microprocessor system. In the following description, numerous specific details such as logic implementations, software module allocation, encryption techniques, bus signaling techniques, and details of operation may be set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a microprocessor system. However, the invention may be practiced in other forms, such as in a digital signal processor, a minicomputer, or a mainframe computer.

Figure 1:
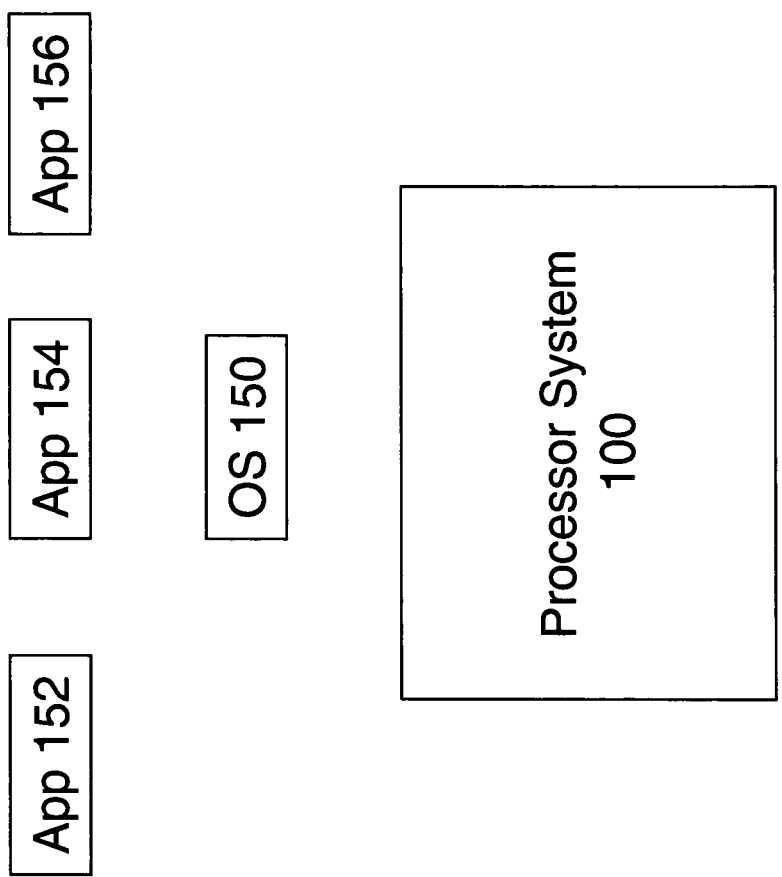
FIG. 1 is a diagram of an exemplary software environment executing in a microprocessor system.

Referring now to FIG. 1, a diagram of an exemplary software environment executing in a microprocessor system is shown. The software shown in FIG. 1 is not trusted (untrusted). When operating in a high privilege level, the size and constant updating of the operating system 150 make it very difficult to perform any trust analysis in a timely manner. Much of the operating system sits within privilege ring zero (0), the highest level of privilege. The applications 152, 154, and 156 have much reduced privilege and typically reside within privilege ring three (3). The existence of the differing privilege rings and the separation of the operating system 150 and applications 152, 154 and 156 into these differing privileged rings would appear to allow operating of the software of FIG. 1 in a trusted mode, based on making a decision to trust the facilities provided by the operating system 150. However, in practice making such a trust decision is often impractical. Factors that contribute to this problem include the size (number of lines of code) of the operating system 150, the fact that the operating system 150 may be the recipient of numerous updates (new code modules and patches) and the fact that the operating system 150 may also contain code modules such as device drivers supplied by parties other than the operating system developer. Operating system 150 may be a common one such as Microsoft® Windows®, Linux, or Solaris®, or may be any other appropriate known or otherwise available operating system. The particular types or names of applications or operating systems run or running are not critical.

Figure 2:
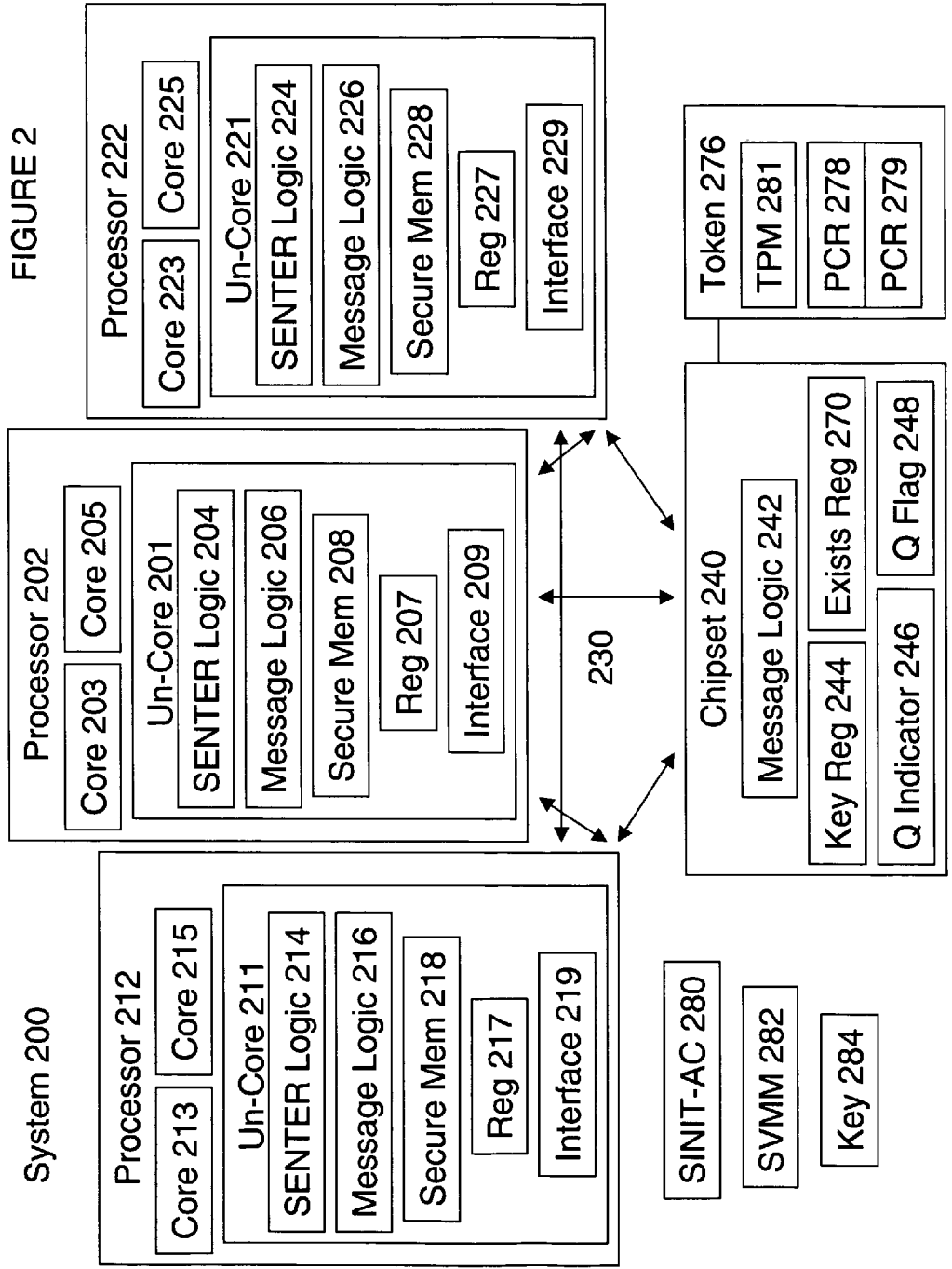
FIG. 2 is a diagram of certain exemplary trusted or secured software modules and exemplary system environment, according to one embodiment of the present invention.

Referring now to FIG. 2, a diagram of certain exemplary trusted or secured software modules and exemplary system environment 200 is shown, according to one embodiment of the present invention. In the FIG. 2 embodiment, processor 202, processor 212, processor 222, and optional other processors (not shown) are shown as separate hardware entities. Although FIG. 2 shows three processors, embodiments of the invention may include any number of processors, including a single processor.

System 200 also includes chipset 240, which may include an input/output (I/O) controller or hub, along with any other system or other logic as described below. Other embodiments may include other components instead or in addition to the components shown in FIG. 2, and the number of processors or other components may differ, as may their arrangement with respect to each other.

Processors 202, 212, and 222 may include one or more execution cores, such as cores 203, 205, 213, 215, 223, and 225. In some embodiments the processors or cores may be replaced by separate hardware execution threads running on one or more physical processors or cores. These threads possess many of the attributes of additional physical processors. In order to have a generic expression to discuss using any mixture of multiple physical processors and multiple threads upon processors, the expression "logical processor" may be used to describe either a physical processor or a thread operating in one or more physical processors. Thus, one single-threaded processor may be considered a logical processor, and multi-threaded or multi-core processors may be considered multiple logical processors.

Processors 202, 212, and 222 may also include "un-core" logic, such as un-core logic 201, 211, and 221, where "un-core" logic is logic that is separate from any of the execution cores. Un-core logic may include registers or any other storage locations, such as registers 207, 217, and 227, which may be used to store information regarding the processor on which is resides. Such registers or storage locations may be programmable or hard-coded, and such information may include the number of cores and/or logical processors included in the corresponding processor. Registers 207, 217, and 227 may be standard global memory mapped registers that are updated during power-on reset.

Processors 202, 212, and 222 may also contain certain special circuits or logic elements to support secure or trusted operations. For example, processor 202 may contain secure enter (SENTER) logic 204 to support the execution of a special SENTER instruction that may initiate trusted operations. Processor 202 may also contain interconnection message logic 206 to support special interconnection messages between processors and other components in support of special SENTER operations. The use of special interconnection messages may increase the security or trustability of the system for several reasons. Circuit elements such as processors 202, 212, and 222 or chipset 240 may only issue or respond to such messages if they contain the appropriate logic elements of embodiments of the present disclosure. Therefore successful exchange of the special interconnection messages may help ensure proper system configuration. Special interconnection messages may also permit activities that should normally be prohibited, such as resetting a platform configuration register 278. The ability of potentially hostile untrusted code to spy on certain interconnection transactions may be curtailed by allowing special interconnection messages to be issued only in response to special security instructions. SENTER logic 204, interconnection message logic 206, and any other logic used in embodiments of the invention may be implemented using any known approach, including logic circuitry, microcode, and firmware.

Additionally, processor 202 may contain secure memory 208 to support secure initialization operations. In one embodiment secure memory 208 may be an internal cache of processor 202 (or a portion of an internal cache that may be temporarily sequestered from the main portion of the cache), perhaps operating in a special mode (e.g., a special mode known as "caches as RAM" or "CRAM" mode). In alternate embodiments secure memory 208 may be special dedicated memory in the un-core. Other processors such as processor 212 and processor 222 may also include SENTER logic 214, 224, bus message logic 216, 226, and secure memory 218, 228.

A "chipset" may be defined as a group of circuits and logic that support memory and/or I/O operations for a connected processor or processors. Individual elements of a chipset may be grouped together on a single chip, a pair of chips, or dispersed among multiple chips, including processors. In the FIG. 2 embodiment, chipset 240 may include circuitry and logic to support I/O operations for processors 202, 212, and 222, while each processor includes circuitry and logic to support memory operations. Alternatively, chipset 240 may also include circuitry and logic to support memory operations for processors 202, 212, and 222. The functions of chipset 240 may be allocated among one or more physical devices in alternate embodiments.

Chipset 240 may additionally include its own interconnection message logic 242 to support special interconnection messages on PTP fabric 230 in support of special SENTER operations. Some of these special interconnection messages may include transferring the contents of a key register 244 to a processor 202, 212, or 222, permitting a processor to set or clear a special "QUIESCE" indicator 246 to cause chipset 240 to quiesce or de-quiese system 200 (as described below), or permitting a special "QUIESCED" flag 248 to be examined by a processor. An additional feature of bus message logic 242 may be to register the existence or participation of processors in system 200 in an "EXISTS" register 270. EXISTS register 270 may be known or implemented in a point-to-point platform as a quiesce agents identification list.

Processors 202, 212, 222 may be connected with each other, to chipset 240, and to any other components or agents through point-to-point (PTP) interconnection fabric 230. Processors 202, 212, and 222, and chipset 240 may include interface units 209, 219, 229, and 239, respectively, to connect to PTP fabric 230 and to transmit and receive messages to and from other each other and any other agents existing or participating in system 200. Each of interface units 209, 219, 229, and 239 may include any number of unidirectional and/or bidirectional ports for communication with any number of other components. Communications may be made through PTP fabric 230 according to a layered point-to-point interconnection architecture, for example, where packets, including signals representing a messages and/or data, framed by any or all of a linking layer, a protocol layer, a routing layer, a transport layer, a physical layer, and any other such layer, are transmitted from one agent to another agent (point-to-point). Accordingly, each of interface units 209, 219, 229, and 239 may include circuitry or logic to generate signals corresponding to each layer. The packets may also include redundant or other information for the detection or correction of errors.

Token 276, containing one or more platform configuration registers (PCR) 278, 279 may be connected to chipset 230. In one embodiment, token 276 may contain special security features, and in one embodiment may include the trusted platform module (TPM) 281 disclosed in the Trusted Computing Platform Alliance (TCPA) Main Specification, version 1.1a, 1 Dec. 2001, issued by the TCPA (available at www.trustedpc.com).

Two software components identified in system environment 200 are a Secure Virtual Machine Monitor (SVMM) 282 module and a Secure Initialization Authenticated Code (SINIT-AC) 280 module. The SVMM 282 module may be stored on a system disk or other mass storage, and moved or copied to other locations as necessary. In one embodiment, prior to beginning the secure launch process SVMM 282 may be moved or copied to one or more memory pages in system 200. Following the secure enter process, a virtual machine environment may be created in which the SVMM 282 may operate as the most privileged code within the system, and may be used to permit or deny direct access to certain system resources by the operating system or applications within the created virtual machines.

Some of the actions required by the secure enter process may be beyond the scope of simple hardware implementations, and may instead advantageously use a software module whose execution may be implicitly trusted. In one embodiment, these actions may be performed by Secure Initialization (SINIT) code. One exemplary action may require that various controls representing critical portions of the system configuration be tested to ensure that the configuration supports the correct instantiation of the secure environment. A second exemplary action may be to calculate and register the SVMM 282 module's identity and transfer system control to it. Here "register" means placing a trust measurement of SVMM 282 into a register (which may include doing a cryptographic HASH-256 or other algorithm) or other storage location, for example into PCR 278 or into PCR 279. When this second action is taken, the trustworthiness of the SVMM 282 may be inspected by a potential system user.

The SINIT code may be produced by the manufacturer of the processors or of the chipsets. For this reason, the SINIT code may be trusted to aid in the secure launch of chipset 240. In order to distribute the SINIT code, in one embodiment a well-known cryptographic hash is made of the entire SINIT code, producing a value known as a "digest". One embodiment produces a 160-bit value for the digest. The digest may then be encrypted by a private key, held in one embodiment by the manufacturer of the processor, to form a digital signature. When the SINIT code is bundled with the corresponding digital signature, the combination may be referred to as SINIT authenticated code (SINIT-AC) 280. Copies of the SINIT-AC 280 may be later validated as discussed below.

The SINIT-AC 280 may be stored on system disk or other mass storage or in a fixed media, and moved or copied to other locations as necessary. In one embodiment, prior to beginning the secure launch process SINIT-AC 280 may be moved or copied into one or more memory pages of system 200 to form a memory-resident copy of SINIT-AC.

Any privileged software running on system 200, such as an operating system, may initiate the secure launch process on a logical processor, which may then be referred to as the initiating logical processor (ILP). In the present example processor 202 is the ILP, although any of the processors on PTP fabric 230 could be the ILP. Neither memory-resident copy of SINIT-AC 280 nor memory-resident copy of SVMM 282 may be considered trustworthy at this time.

The ILP (processor 202) executes a special instruction to initiate the secure launch process. This special instruction may be referred to as a secured enter (SENTER) instruction, and may be supported by SENTER logic 204. The SENTER instruction may first verify that every logical processor in system 200 is registered in chipset 240, for example in EXISTS register 270. Each processor and other agent connected to PTP fabric 230 includes a register or other storage location, such as registers 207, 217, and 227, to indicate the number of logical processors that it includes. In one embodiment, these registers are read to verify that the system topology is accurately represented in chipset 240. In another embodiment, these registers may not be read, but EXISTS register 270, which may be the quiesce agents identification list, may be trusted.

After this verification, the SENTER instruction writes to QUIESCE indicator 246 to cause chipset 240 to quiesce system 200. Chipset 240 begins a hardware driven message protocol based handshake sequence on PTP fabric 230 to cause all processors and other agents on PTP fabric 230, except for one processor (the quiescent state master), to enter a quiescent state. In this embodiment, processor 202 is the quiescent state master as well as the ILP. The quiescence sequence may include sending a "STOP_REQ" signal to each non-master processor to cause them to finish their event processing, drain their buffers, and return a "STOP_ACK" signal back to chipset 240 to acknowledge their entry into a quiescent state. The quiescent state is a state in which they execute no instructions and generate no transactions on PTP fabric 230, but snoop traffic remains active to maintain cache coherence. After chipset 240 receives a STOP_ACK signal from every agent on behalf of every logical processor registered in chipset 240, QUIESCED flag 248 may be set.

After the system is quiesced, the SENTER instruction microcode running on the queisce master or ILP may securely execute the security module(s) as described below. For this purpose, PTP fabric 230 is still functional and TPM 281 is still accessible to the quiescent state master. After the execution of the security module(s) is complete, the quiescent state master may clear QUIESCE indicator 246 to cause chipset 240 to bring system 200 out of the quiesced state.

To execute the security module(s), the ILP (processor 202) may first move both a copy of SINIT-AC 280 and key 284 into secure memory 208 for the purpose of authenticating and subsequently executing the SINIT code included in SINIT-AC 280. In one embodiment, this secure memory 208 may be an internal cache of the ILP (processor 202), perhaps operating in a special mode, such as CRAM mode. Key 284 represents the public key corresponding to the private key used to encrypt the digital signature included in the SINIT-AC 280 module, and is used to verify the digital signature and thereby authenticate the SINIT code. In one embodiment, key 284 may already be stored in the processor, perhaps as part of the SENTER logic 204. In another embodiment, key 284 may be stored in a read-only key register 244 of chipset 240, which is read by the ILP. In yet another embodiment, either the processor or the chipset's key register 244 may actually hold a cryptographic digest of key 284, where key 284 itself is included in the SINIT-AC 280 module. In this last embodiment, the ILP reads the digest from key register 244, calculates an equivalent cryptographic hash over the key 284 embedded in SINIT-AC 280, and compares the two digests to ensure the supplied key 284 is indeed trusted.

A copy of SINIT-AC and a copy of a public key may then exist within secure memory 208. The ILP may now validate the copy of SINIT-AC by decrypting the digital signature included in the copy of the SINIT-AC using the copy of a public key. This decryption produces an original copy of a cryptographic hash's digest. If a newly-calculated digest matches this original digest then the copy of SINIT-AC and its included SINIT code may be considered trustable.

The ILP may now register the unique identity of the SINIT-AC module by writing the SINIT-AC module's cryptographic digest value to a platform configuration register 272 in the security token 276, as outlined below. The ILP's execution of its SENTER instruction may now terminate by transferring execution control to the trusted copy of the SINIT code held within the ILP's secure memory 208. The trusted SINIT code may then perform its system test and configuration actions and may register the memory-resident copy of SVMM, in accordance with the definition of "register" above. The SINIT code may protect the memory-resident copy of the SVMM while it is being measured and prepared for execution, by configuring memory range registers in the chipset to direct the chipset hardware to reject direct memory access and bus master access to the SVMM memory region.

Registration of the memory-resident copy of SVMM may be performed in several manners. In one embodiment, the SENTER instruction running on the ILP writes the calculated digest of SINIT-AC into PCR 278 within the security token 276. Subsequently, the trusted SINIT code may write the calculated digest of the memory-resident SVMM to the same PCR 278 or another PCR 279 within the security token 276. If the SVMM digest is written to the same PCR 278, the security token 276 hashes the original contents (SINIT digest) with the new value (SVMM digest) and writes the result back into the PCR 278. In embodiments where the first (initializing) write to PCR 278 is limited to the SENTER instruction, the resulting digest may be used as a root of trust for the system.

The SINIT code may also write the de-quiesce register of the chipset to release all of the auxiliary or responding logical processors (RLPs) from the quiesced condition. This may initiate a protocol (e.g., a START# signal protocol) on the PTP fabric to start up these processors. The START# signal may also trigger a microcode event that takes all the RLPs to a special secure machine state (e.g., a Wait for SIPI state) where they wait until awakened by the trusted operating system sending a special secure wake-up interrupt. Once the trusted SINIT code has completed its execution, and has registered the identity of the SVMM in a PCR, the SINIT code may transfer ILP execution control to the SVMM. In a typical embodiment, the first SVMM instructions executed by the ILP may represent a self-initialization routine for the SVMM. System 200 may then be operated in trusted mode, as outlined in the discussion of FIG. 3 below, under the supervision of the now-executing copy of SVMM. From this point onwards, the overall system is operating in trusted mode as outlined in the discussion of FIG. 3 below.

Figure 3:
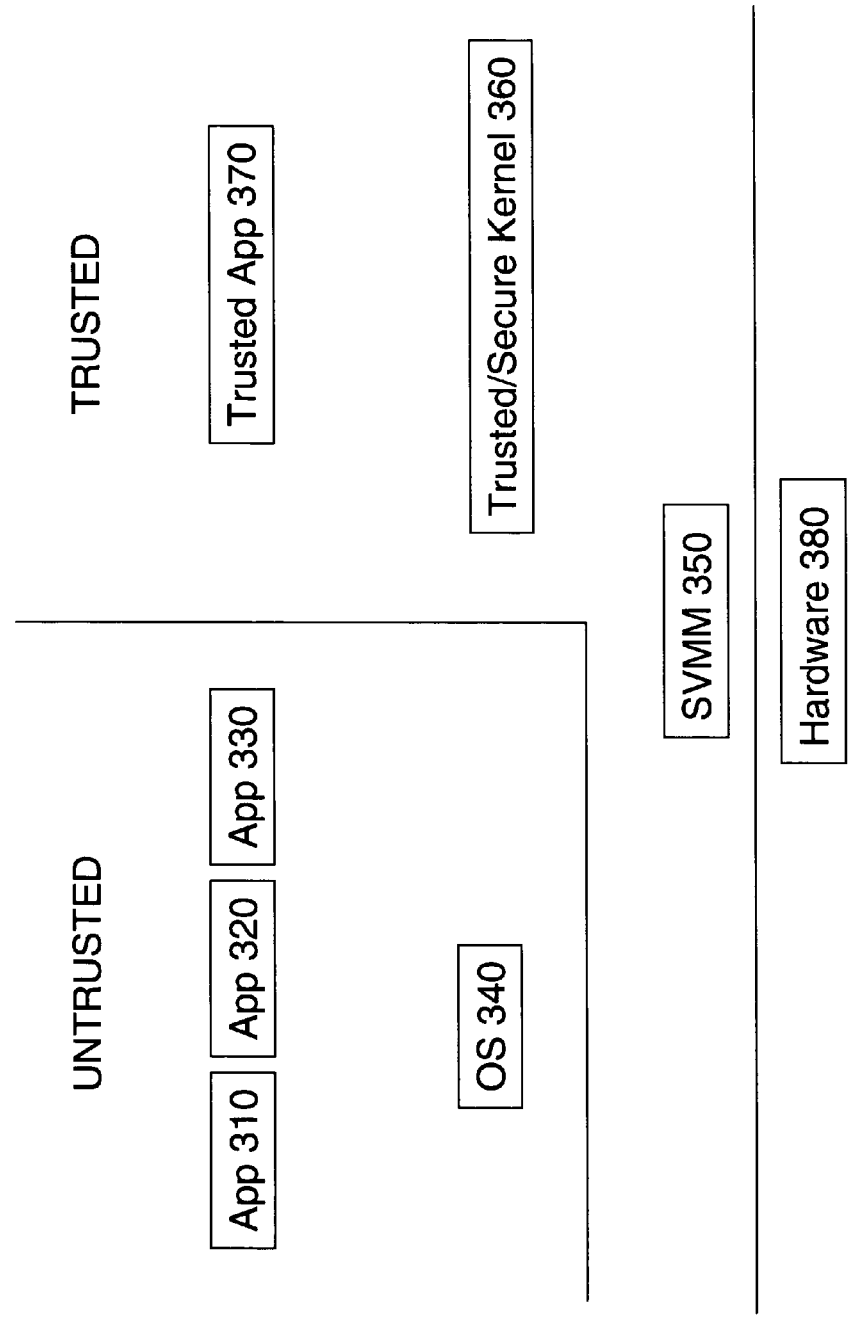
FIG. 3 is a diagram of an exemplary trusted or secured software environment, according to one embodiment of the present invention.

Referring now to FIG. 3, a diagram of an exemplary trusted or secured software environment is shown, according to one embodiment of the present invention. In the FIG. 3 embodiment, trusted and untrusted software may be loaded simultaneously and may execute simultaneously on a single computer system. A SVMM 350 selectively permits or prevents direct access to hardware resources 380 from one or more untrusted operating systems 340 and untrusted applications 310 through 330. In this context, "untrusted" does not necessarily mean that the operating system or applications are deliberately misbehaving, but that the size and variety of interacting code makes it impractical to reliably assert that the software is behaving as desired, and that there are no viruses or other foreign code interfering with its execution. In a typical embodiment, the untrusted code might consist of the normal operating system and applications found on today's personal computers.

SVMM 350 also selectively permits or prevents direct access to hardware resources 380 from one or more trusted or secure kernels 360 and one or more trusted applications 370. Such a trusted or secure kernel 360 and trusted applications 370 may be limited in size and functionality to aid in the ability to perform trust analysis upon it. The trusted application 370 may be any software code, program, routine, or set of routines which is executable in a secure environment. Thus, the trusted application 370 may be a variety of applications, or code sequences, or may be a relatively small application such as a Java applet.

Instructions or operations normally performed by operating system 340 or kernel 360 that could alter system resource protections or privileges may be trapped by SVMM 350, and selectively permitted, partially permitted, or rejected. As an example, in a typical embodiment, instructions that change the processor's page table that would normally be performed by operating system 340 or kernel 360 would instead be trapped by SVMM 350, which would ensure that the request was not attempting to change page privileges outside the domain of its virtual machine.

Figure 4:
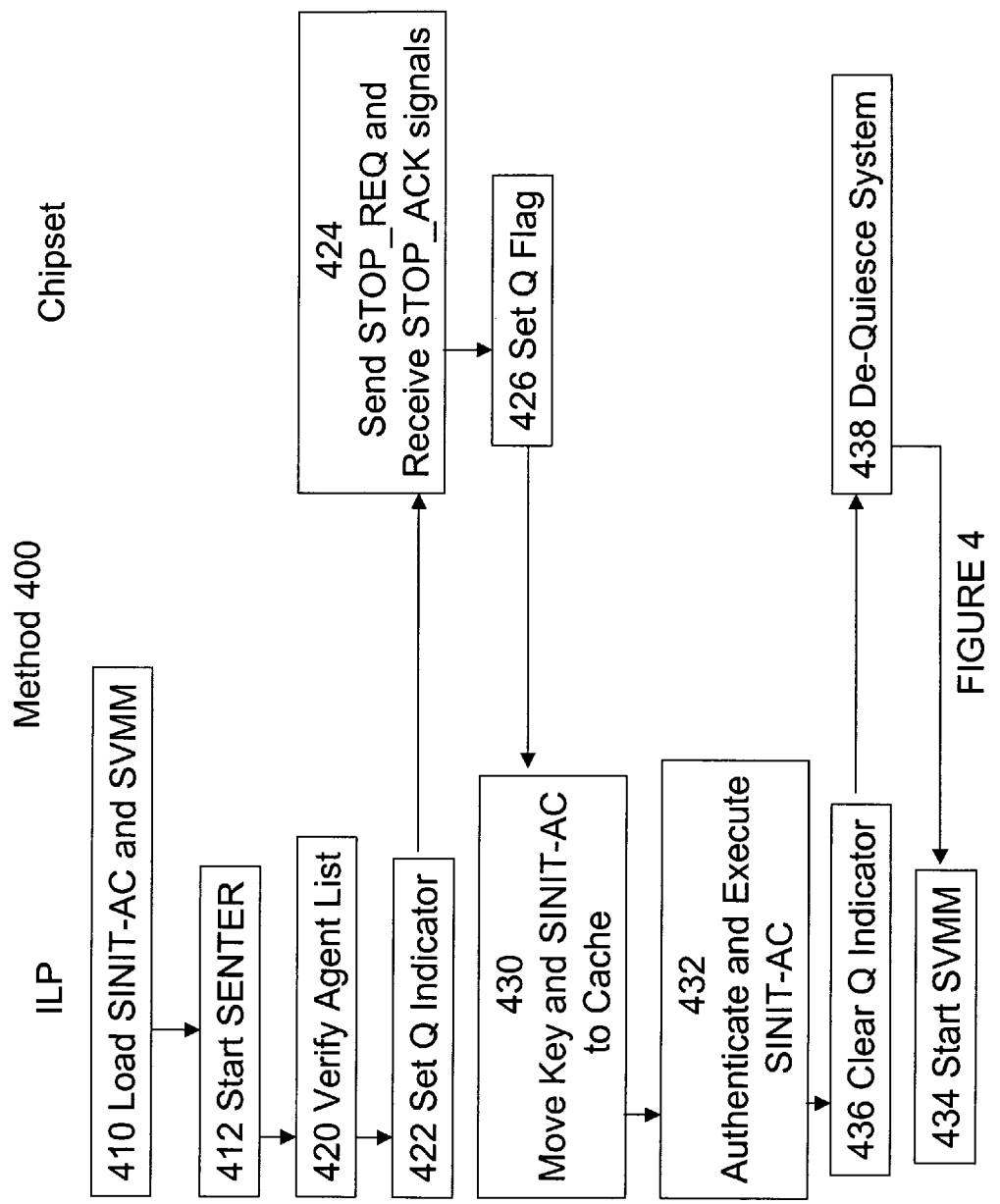
FIG. 4 is a flowchart of software and other process blocks, according to a method embodiment of the present invention.

Referring now to FIG. 4, a flowchart of software and other process blocks is shown, according to an embodiment of the present invention in method 400.

In block 410 of method 400, a logical processor makes a copy of the SINIT-AC and SVMM modules available for access by a subsequent SENTER instruction. In this example, an ILP loads the SINIT-AC and SVMM code from mass storage into physical memory. In alternative embodiments, any logical processor may do so, not just the ILP. A processor becomes the ILP by executing the SENTER instruction, as identified in block 412.

In block 420, the SENTER instruction verifies that every logical processor in system 200 is registered in chipset 240, for example in EXISTS register 270. In block 422, the SENTER instruction writes to QUIESCE indicator 246 to cause chipset 240 to quiesce system 200. In block 424, chipset 240 sends "STOP_REQ" signals to each non-master processor to cause them to finish their event processing, drain their buffers, and return a "STOP_ACK" signal back to chipset 240 to acknowledge their entry into a quiescent state. In block 426, QUIESCED flag 248 is set to indicate that chipset 240 has received a STOP_ACK signal from every agent on behalf of every logical processor registered in chipset 240.

In block 430, the ILP moves the public key of the chipset and the memory-resident copy of SINIT-AC into its own secure memory for secure execution. The ILP, in block 432, uses the key to validate the secure-memory-resident copy of SINIT-AC, and then executes it. The execution of SINIT-AC may perform tests of the system configuration and the SVMM copy, and register the SVMM identity. In block 436, the quiescent state master clears QUIESCE indicator 246 to cause chipset 240 to bring system 200 out of the quiesced state in block 438. Blocks 436 and 438 may include writing to a de-quiesce register in the chipset to release the RLPs from the quiesced condition, and a start-up protocol for the RLPs, as discussed above. Execution of the SVMM begins in block 434.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
   a chipset including a single quiesce indicator; and
   a first processor of a plurality of processors coupled to a point-to-point fabric, the first processor to execute a secured enter instruction by writing to the single quiesce indicator to cause the chipset to quiesce all processors of the plurality of processors, except the first processor, during execution of the secured enter instruction, and to clear the single quiesce indicator after executing the secured enter instruction to cause the chipset to bring the system out of the quiesced state.

2. The system of claim 1, wherein the chipset is also coupled to the point-to-point fabric.

3. The system of claim 2, wherein the chipset is also to cause the system to enter the quiescent state in which only the first processor and the chipset communicate through the point-to-point fabric.

4. The system of claim 1, further comprising a trusted platform module, wherein the trusted platform module is accessible to the first processor during the quiescent state.

5. The system of claim 1, wherein the first processor is also to execute a secure initialization authenticated code module.

6. The system of claim 1, wherein the first processor is also to execute a secure virtual machine monitor module.

7. The system of claim 1, wherein: the chipset includes: a first storage location to indicate the identity of each processor in the system; a second processor includes a second storage location to indicate that the second processor is connected to the point-to-point fabric; and the first processor includes logic to verify that the identity of the second processor is indicated in the first storage location before accessing the indicator to cause the chipset to quiesce the system.

8. A method, comprising:
   starting to execute a secured enter instruction on a first processor of a plurality of processors coupled through a point-to-point fabric;

the processor, during execution of the secured enter instruction, writing to a single quiesce indicator in a chipset to cause the chipset to quiesce all processors of the plurality of processors, except the first processor; and the processor, after execution of the secured enter instruction, clearing the single quiesce indicator to cause the chipset to bring the system out of the quiesced state.

9. The method of claim 8, further comprising the chipset maintaining a list of agents coupled to the point-to-point fabric.

10. The method of claim 9, further comprising reading a storage location in a second processor to identify the number of agents coupled to the point-to-point fabric through the second processor.

11. The method of claim 8, further comprising the first processor accessing a trusted platform module during the quiescent state.

12. The method of claim 11, further comprising executing a secure initialization authentication module.

13. The method of claim 12, further comprising reading a quiesced indicator in the chipset to verify that the quiescent state has been entered before executing the secure initialization authentication module.

14. The method of claim 11, further comprising executing a secure virtual machine monitor module.

15. The method of claim 14, further comprising reading a quiesced indicator in the chipset to verify that the quiescent state has been entered before executing the secure virtual machine monitor module.

16. The method of claim 8, further comprising causing a second processor to finish its event processing and drain its buffers before entering the quiescent state.

17. The method of claim 16, further comprising the second processor sending a signal to the chipset to acknowledge its entry into the quiescent state.

18. A processor, comprising:

secure enter logic to execute a first instruction to invoke secure operation initialization; and interconnection messaging logic to write to a single quiesce indicator in a chipset to cause the chipset to quiesce a plurality of other processors coupled to the processor through a point-to-point fabric, and to clear the single quiesce indicator after executing the secured enter instruction to cause the chipset to bring the system out of the quiesced state.

\* \* \* \* \*